No. 651,507. Patented June 12, 1900.
L. LACAILLE.
WEIGHT MEASURER AND CUTTER FOR CHEESE.
(Application filed Mar. 22, 1900.)
(No Model.)

Witnesses, Inventor
Louis Lacaille
By Dewey Strong & Co.
Atty.

THE NORRIS PETERS CO., PHOTO-LITHO., WASHINGTON, D. C.

UNITED STATES PATENT OFFICE.

LOUIS LACAILLE, OF GOLDEN GATE, CALIFORNIA.

WEIGHT-MEASURER AND CUTTER FOR CHEESE.

SPECIFICATION forming part of Letters Patent No. 651,507, dated June 12, 1900.

Application filed March 22, 1900. Serial No. 9,699. (No model.)

*To all whom it may concern:*

Be it known that I, LOUIS LACAILLE, a citizen of the United States, residing at Golden Gate, county of Alameda, State of California, have invented an Improvement in Weight-Measurers and Cutters for Cheese; and I hereby declare the following to be a full, clear, and exact description of the same.

My invention relates to a device for accurately measuring the sizes of cuts, so that by such measurement the cheese may be cut to the exact weight called for by the customer. It consists of the parts and the constructions and combinations of parts hereinafter described and claimed.

Figure 1:
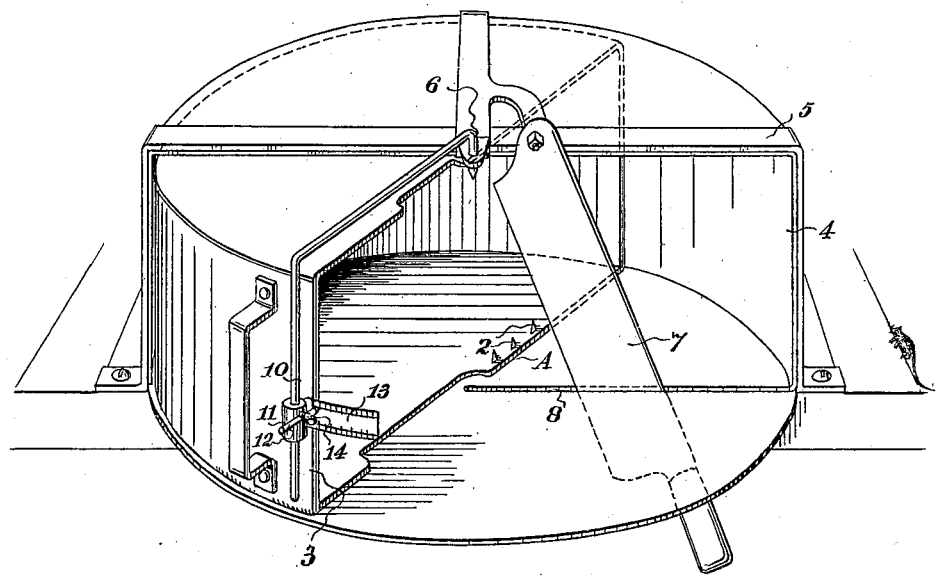
Figure 2:
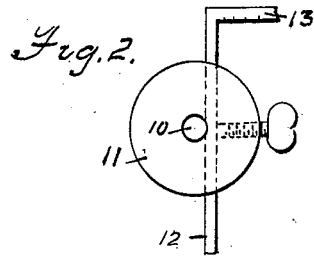

Figure 1 is a perspective view of my improved weight-measurer and cutter. Fig. 2 is an enlarged plan view of the sleeve 11, showing the rods 10 and 12 and the single set-screw.

The object of this invention is to provide a means for accurately cutting cheese into the required weights when the cheese is to be sold in small quantities. This is to be accomplished by first weighing the whole cheese, and the circumference of a cheese being known it can easily be ascertained how much of a cut will equal any given weight or proportion of the whole body of the cheese, and in order to make this accurate it is necessary that the measurement of the cheese be taken at its largest diameter, which is at a point midway between the top and bottom by reason of the convexity of the periphery of the cheese.

My apparatus consists of a base-plate A, having upwardly-projecting teeth, corrugations, or other roughnesses 2, which will serve to hold the cheese in place when placed thereon, there being a central point or guide, so that the cheese can be placed concentrically upon this circular base. This base may be inclosed by any suitable protecting-cover. As shown in the present case, the base upon which the cheese is supported forms a semicircle, and that part of the casing 3 which is carried by it is semicylindrical and is turnable within a second semicylindrical section or casing 4 of sufficiently-larger diameter to allow the first section to turn freely within it.

I have shown a frame or yoke 5 extending over the top of the casing and down the sides, so that it may be bolted or secured to a table or other support, leaving one-half of the diameter projecting beyond the edge for a purpose to be hereinafter described. A bolt or pin 6, passing through this frame and through the centers of the two casings, serves as a guide and allows the inner casing to be turned with reference to the outer one, which is secured by the yoke or frame.

7 is a knife or cutter having the inner end pivoted to the frame, near the center, as shown, and a handle upon the outer end, the knife being of sufficient length to cut through any cheese which may be required from top to bottom.

A slot or channel 8 is made in the casing, so that when closed there will be sufficient room for the knife to move within this slot or channel, which is also continued through the bottom or base to the center for the purpose of allowing the knife to pass down through the cheese vertically at first, then diagonally as it approaches the bottom, and finally it moves horizontally toward the center, these movements taking place as it swings around its pivotal point, and any cut made by the knife moving in this manner will cut out a wedge-shaped piece.

When the knife is not in use, it is allowed to hang suspended from its pivot-point with the handle downward and the edge of the blade turned inwardly toward the center and out of the way of damage or danger.

In order to cut the cheese accurately for any weight—such as one-half, one, one and one-half, and two pounds, or other amount—it is necessary to first ascertain the whole weight of the cheese. Then by dividing its greatest circumference any proportion of the weight may be obtained. This cannot be properly effected by marking a scale around the bottom as might at first seem proper; but the scale must be marked around the cheese midway between the upper and lower faces, which is its largest diameter, on account of its convexity. In order to effect this and carry the scale in the proper position, I have shown an arm 10 pivoted centrally with relation to the base A. Thence it turns upwardly in a vertical position, so that the vertical arm will stand outside of the largest cheese which the case will hold. Upon this arm is fixed a slidable sleeve or socket 11, and transversely through this socket is an arm 12, carrying upon its inner end a curved scale 13.

For convenience in securing the parts together the hole through which the rod passes intersects the hole in the center of the sleeve 11, and a set-screw 14, passing through the side of the sleeve 11, so as to bind the rod 12, will, by pressing this rod against the vertical rod 10, also lock the sleeve in place. This allows of two adjustments with a single setscrew, one a vertical adjustment to bring the scale 13 opposite the center of the cheese vertically and the other allows the rod 12 to slide in and out to bring the scale close to the periphery of the cheese. The cheese having, as previously stated, been weighed, and the segment which is to form the unit being determined, it is only necessary to turn a cheese so that the proper proportion is measured off by the scale 13, and the knife is then pressed down through the cheese and the cut completed.

Practical experiments have shown that the cheese can be cut accurately to any amount from one-fourth to one-half a pound up and without variation.

Having thus described my invention, what I claim as new, and desire to secure by Letters Patent, is—

1. A cheese-case composed of two hollow semicylindrical segments, each formed rigid with closed ends, and one segment being turnable within the other, means for fixing the outer segment upon a support, projections formed in the bottom of the inner segment upon which the cheese is supported concentrically with said bottom, and turnable therewith, a knife having one end fulcrumed near the center of the top of the case, a radial slot in the bottom of the outer segment through which the knife is movable and adapted to swing downwardly to cut through the cheese, and to hang in a vertical position with the edge at the center of the cheese.

2. A cheese-case consisting of hollow semicylindrical segments centrally pivoted directly to each other, and one segment being turnable within the other and having projections adapted to support a cheese, concentric with the base, a radial slot formed in the bottom of the outer segment and a knife pivoted at the top near the center adapted to move through a quadrantal arc whereby a segment of the cheese is cut, and a scale with means for applying it to the periphery of the cheese, whereby the weight of the amount cut is determined.

3. A means for determining the weight of a given cut of cheese, consisting of a scale extending in the direction of the circumference of the cheese, means for applying it at the periphery of the cheese midway between the upper and lower faces, whereby the weight of the cheese being ascertained and a unit of peripheral measurement and weight being determined, said unit or any multiple thereof is determined by the application of the scale.

4. A means for determining and cutting proportionate sizes and weights of cheese, consisting of a scale curved to fit the periphery of a cheese, a support for said scale whereby it may be adjusted vertically to stand midway between the opposite faces of the cheese, and horizontally to bring the scale into proximity with the periphery, a pivoted vertically-movable cutter having its pivotal point near the center of the top of the cheese, and means for bringing said cutter upon the indicated line.

In witness whereof I have hereunto set my hand.

LOUIS LACAILLE.

Witnesses:
  AIME A. SICOTTE,
  CHARLES L. WINES.